United States Patent [19]

Henderson

[11] Patent Number: 4,526,731
[45] Date of Patent: Jul. 2, 1985

[54] PARTICULATING MATERIALS

[76] Inventor: E. Webb Henderson, c/o Phillips Petroleum Company, Bartlesville, Okla. 74004

[21] Appl. No.: 556,221

[22] Filed: Nov. 29, 1983

[51] Int. Cl.³ .............................................. B29C 6/00
[52] U.S. Cl. ......................................... 264/5; 201/6; 201/8; 264/7; 264/13; 264/37; 423/460; 425/6; 425/10
[58] Field of Search .................. 264/5, 7, 13, 15, 117, 264/121, 140, 37; 425/6, 10; 201/6, 8; 423/460

[56] References Cited

U.S. PATENT DOCUMENTS

| | | | |
|---|---|---|---|
| 2,040,770 | 5/1936 | Grote | 134/60 |
| 2,457,963 | 1/1949 | Thodos | 18/1 |
| 2,538,482 | 1/1951 | Studebaker | 23/314 |
| 2,548,332 | 4/1951 | Alexander et al. | 259/7 |
| 2,921,335 | 1/1960 | Bowers et al. | 425/10 |
| 3,001,228 | 9/1961 | Nalk | 264/7 |
| 3,026,568 | 3/1962 | Moar | 264/7 |
| 3,042,504 | 7/1962 | Carter | 23/314 |
| 3,231,649 | 1/1966 | Pfeiffer | 264/109 |
| 3,277,218 | 10/1966 | Dollinger | 264/117 |
| 3,333,949 | 8/1967 | Ayers et al. | 264/13 |
| 3,391,234 | 7/1968 | Walenciak et al. | 264/117 |
| 3,406,426 | 10/1968 | Pobst, Jr. et al. | 425/135 |
| 3,429,958 | 2/1969 | Walcott | 264/117 |
| 3,636,148 | 1/1972 | Slagel | 264/117 |
| 3,671,613 | 6/1972 | Gotshall | 264/115 |
| 3,981,659 | 9/1976 | Myers | 264/117 |
| 4,158,682 | 6/1979 | Price et al. | 264/40.7 |
| 4,251,475 | 2/1981 | Varrasso et al. | 264/40.1 |
| 4,349,199 | 8/1982 | Speier et al. | 264/15 |

Primary Examiner—Jeffery Thurlow
Assistant Examiner—Patrick Dailey

[57] ABSTRACT

An apparatus for drying pellets of particulate material such as carbon black is characterized by a columnar drying vessel containing inclined trays or screens positioned so that the pellets or particulates roll from screen to screen down the column. Preferably, the pellets are subjected to countercurrent flow of drying gases while flowing down the screens. In other aspects, carbon black is pelleted with a nonaqueous liquid pelleting fluid and dried with vapors of the same pelleting fluid.

18 Claims, 1 Drawing Figure

PARTICULATING MATERIALS

BACKGROUND OF THE INVENTION

The invention relates to particulating or agglomerating materials. In one aspect, the invention relates to particulating carbon black. In another aspect, the invention relates to an apparatus for particulating materials such as carbon black. In yet another aspect, the invention relates to drying particulating materials such as particles of carbon black.

Pelletizing fine materials is frequently a troublesome and expensive process. For example, in the pelleting of carbon black using water as a pelleting fluid, the cost of operating the pelleting and subsequent drying process can amount to as much as ⅓ of the total cost of producing the finished, pelleted product. One of the reasons why operating costs are so high is the high energy requirement for driving water from the carbon black pellets. Another reason is that the water vapors liberated from the pellets combine with the acid gases produced as a byproduct during the manufacturing process and severely corrode processing equipment. Reducing the costs and energy usage in a carbon black manufacturing process would clearly be very desirable.

OBJECTS OF THE INVENTION

It is an object of this invention to provide a process for particulating or pelleting carbon black which is characterized by only a small fraction of the energy requirement used in the conventional wet pelleting of carbon black with water as the pelleting agent. It is a further object of this invention to provide an apparatus for providing pellets or agglomerated particles of carbon black which is well suited for carrying out the process of the invention.

SUMMARY OF THE INVENTION

In one aspect, carbon black is pelleted with a liquid pelleting fluid to form wet pellets of carbon black and pelleting fluid. The wet pellets are then dried with hot vapors of the same pelleting fluid. By using the same fluid to dry the pellets as to pellet them recycling of the pelleting and drying fluids is greatly simplified and energy losses which would otherwise be incurred in separation procedures are avoided. Where the pelleting fluid is characterized by heat of vaporization of less than about 30,000 BTU/FT$^3$ the pellets can be dried with considerably less than the energy requirements of a process where water, with a heat of vaporization of about 56,000 BTU/FT$^3$, is used as the pelleting fluid. Where the pelleting fluid has normal boiling point in the range from about $-50°$ F. to about 300° F. the drying operation can be carried at a temperature sufficiently close to ambient so that heat losses can be kept at low levels.

In a further aspect of the present invention there is provided a process which comprises introducing wet pellets of carbon black which is wetted with a liquid pelleting fluid into the upper end of drying vessel. The pellets are rolled to the lower end of the drying vessel. Hot vapors of the pelleting fluid are introduced into the lower end of the drying vessel. The hot vapors are then flowed to the upper end of the drying vessel in intimate countercurrent contact with the wet pellets, thus drying them. The dry pellets are then removed from the lower end of the drying vessel.

According to still further aspects of the present invention, there is provided a process comprising spraying a slurry of carbon black and the liquid pelleting fluid into the upper portion of a drying vessel. A stream of carbon black pellets is also introduced into the upper portion of the drying vessel so that the slurry spray deposits on the pellets. The pellets are flowed to the lower portion of the drying vessel and withdrawn. A heated stream of pelleting fluid vapor is introduced into the lower portion of the drying vessel for countercurrent flow with respect to the pellets and a stream of pelleting fluid vapor is withdrawn from an upper portion of the drying vessel. By combining pellets and slurry in the upper portion of the vessel, a portion of the pelleting fluid is absorbed by the pellets so that the surface of the pellets quickly becomes dry and non-sticky. Handling of the pellets during the drying process is greatly simplified since thick coatings of carbon black on the inside of the vessel can be avoided.

In yet another aspect of the present invention, there is provided a process which comprises introducing a slurry of carbon black and liquid pelleting fluid into a concentration or flash vessel and concentrating the slurry by subjecting the same to intimate countercurrent contact with hot vapors of pelleting fluid to form a concentrated slurry. The concentrated slurry is withdrawn from the concentrating vessel and introduced into the upper end of the drying vessel. By first concentrating the slurry in a concentrating vessel, preferably a flash vessel, the concentration of carbon black can be raised up to the range of about 25 percent by weight which is near the upper limits of flow. The slurry can then be formed into droplets which can be surface dried prior to striking the surfaces of the drying vessel so that they will not stick. The hot pelleting fluid can then be flowed in intimate countercurrent contact with the droplets of the slurry to transform the droplets into pellets.

Accordingly to a still further aspect of the present invention, there is provided an apparatus comprising a columnar vessel having a longitudinal axis, an upper end, and a lower end. A plurality of screens or apertured baffles are positioned in the columnar vessel. The screens or baffles are inclined with respect to the longitudinal axis. Each of the screens or baffles has an upper end and a lower end and is positioned so that the upper end will receive material from the lower end of the screen or baffle located above it. The vessel is provided with a means for introducing a hot gas into its lower end and means for withdrawing a gas stream from its upper end. A means for introducing a mixture of particulate material and a liquid in the upper end of the columnar vessel is also present as well as means for withdrawing a particulate material from the lower end of the columnar vessel. Where the apparatus is used to particulate material such as carbon black, the screens provide the carbon black passing through the vessel with sufficient residence time so that the liquid pelleting agent can be removed.

DETAILED DESCRIPTION OF THE INVENTION

Figure 1:
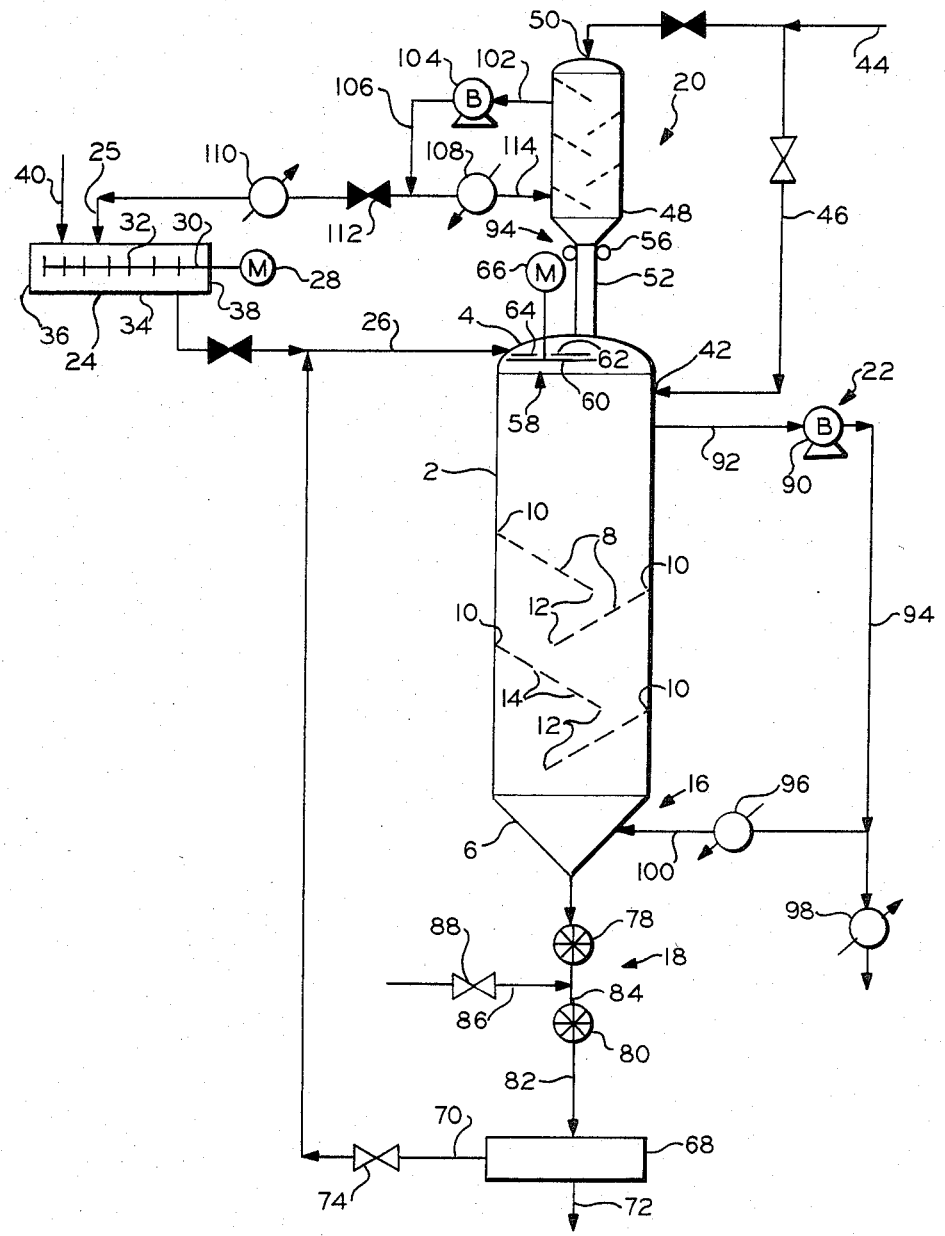
FIG. 1 illustrates schematically certain features of the present invention.

According to certain aspects of the present invention, there is provided a columnar vessel 2 having a longitudinal axis, an upper end 4 and a lower end 6. By columnar is meant that the vessel has a height which is greater than its width. Preferably, the vessel 2 is generally cylindrical and has an interior length to diameter ratio which is in the range of from about 2:1 to about 50:1. For carbon black service, the vessel should be formed from stainless steel to resist corrosion. The vessel can be steam traced if desired for additional heat input.

A plurality of screens or apertured baffles 8 are positioned in the columnar vessel 2. Each of the screens or apertured baffles is inclined about 60° from vertical with respect to the longitudinal axis of the columnar vessel. Each of the screens or baffles has an upper end 10 and a lower end 12. With the exception of the uppermost baffle, each of the baffles has an upper end positioned to receive material from the lower end of the screen or baffle 8 which is located above it. Each of the screens or baffles 8 is provided with a plurality of apertures 14. The size of the apertures 14, by which is meant the size of the spherical particle which will pass through the aperture, is generally between about 10 percent and 1,000 percent of the average size of the particles to be dried in the device. Usually, from about 5 percent to about 95 percent of the screen or baffle 8 is open area due to the aperture. The vessel 2 is provided with a means 16 for introducing a hot gas into the lower end 6. There is further provided a means 18 for withdrawing a particulate material from the lower end 6 of the vessel 2. At the upper end 4 of the columnar vessel 2, there is provided a means 20 for introducing a mixture of particulate material and liquid. Also provided is a means 22 for withdrawing a gas stream from the upper end 4 of the columnar vessel 2.

In one embodiment of the invention, the means 20 comprises a pin pelleter 24 and a conduit 26 which connects the pin pelleter 24 with the columnar vessel 2. The pin pelleter 24 can be conventional and in such event will comprise a motor 28 driving a rotating shaft 30 having generally radially extending pins 32 affixed thereto. The pinned section of the shaft 30 is positioned in a generally cylindrical housing 34 having an upstream end 36 and a downstream end 38. Particulate material can be introduced via a particulate material inlet 40 at the upper end 36 of the pin pelleter and a pelleting fluid via a pelleting fluid inlet 25 at the upper end of the pin pelleter 24. The agglomerated or particulated mixture can then be withdrawn from adjacent the downstream end 38 of the pin pelleter 24 via the line 26.

In another aspect of the present invention, the means 20 for introducing the mixture of particulate material and liquid comprises at least one nozzle 42 positioned to emit a spray of particulate material and liquid into the upper end 4 of the columnar vessel 2. Six nozzles 42, for example, are expected to provide good results. Care should be taken to insure that the spray does not impinge upon the opposite wall of the vessel 2. The nozzle 42 will generally be connected to a source of particulate material and liquid such as the line 44 by a suitable conduit means such as conduit 46, for example. The slurry will generally contain from about 1 percent up to about 30 percent of carbon black since slurries containing higher amounts of carbon black are not readily pumpable or sprayable.

In a further aspect of the invention, the means 20 for introducing the mixture of particulate material and the liquid comprises a flash concentrator vessel connected to the upper end of the columnar vessel 2. One or more nozzles 50 spray a mixture of particulate material and liquid into the upper end of the vessel 48. A conduit 52 at the lower end of the flash concentrator vessel 48 establishes the flow path between the flash concentrator 48 and the generally columnar drying vessel 2. Preferably, a means 56 is associated with the conduit 52 for controlling the rate of flow therethrough. Where the mixture of particulate and liquid carried by the conduit 52 is approaching the upper limit for effective flow, the means 54 can comprise a length of flexible conduit which forms the conduit means 52 and a pincher 56 such as one or more rolls or bars associated with the exterior of the flexible conduit for control of flow through the conduit means 52. A disk-type distributor 58 having a spinning disk 60 is positioned in the upper end 4 of the columnar vessel 2 with the plane of the disk about normal to the longitudinal axis of the columnar vessel 2. The face 62 of the disk facing the upper end 4 of the columnar vessel is preferably provided with a plurality of generally radially extending vanes 64 attached thereto. The disk 60 is positioned to receive material from the flexible conduit 52 and a drive motor 66 is connected to the disk for spinning it.

For certain applications, it can be desirable to provide a separation means 68 generally containing a set of vibrating screens connected to the means 18 for withdrawing particulate material from the lower end 6 of the columnar vessel 2. In the separation means 68 a first portion of the particulate material can be separated and withdrawn from the separation means 68 via a conduit means 70 from a second portion of the material which can be withdrawn from the separation means 68 via conduit means 72. In the illustrated embodiment, the conduit means 70 contains a valve 74 which is opened when it is desired to connect the separation means 68 to the upper end 4 of the columnar vessel 2. Dried particulate material can be recycled to the columnar vessel 2 as desired. Where a mixture of particulate material and liquid is sprayed into the columnar vessel 2, the simultaneous introduction of recycled particulate material will provide a non-fouling surface on which the spray can deposit and the particulate substrate will wick away the liquid from the mixture sprayed thereon. The recycled particulate material can be distributed if desired by being deposited on a spinning disk 58 as previously described.

The means 18 for withdrawing particulate material from the lower end 6 of the columnar vessel 2 can be formed from a lock hopper or the like. In the illustrated device, an upper star valve 78 and the lower star valve 80 are positioned in a conduit 82 which connects the lower end 6 of the columnar vessel 2 with the separation means 68. By alternately opening and closing the star valve 78 and 80, particulate material can be withdrawn from the lower end 6 of the columnar vessel 2 without uncontrolled depressurization or devacuumization depending on the characteristics of the pelleting liquid used under the conditions found in the columnar vessel 2. It can be desirable to introduce a stripping gas into the lock hopper defined between the star valve 78 and 80 to flush vapors of the pelleting fluid from the lock hopper 84 into the columnar vessel 2. For this purpose, steam is desirably utilized and it can be introduced into the lock hopper 84 via a line 86 by operating a valve 88 positioned in the line 86. The line 86 is connected to a suitable steam source which will generally be at a temperature sufficiently high to prevent condensation in the lock hopper 84 or columnar vessel 2. The valve 78, 80 and 88 can be opened and closed in a cyclic sequence to withdraw material from the lower end 6 of the columnar vessel 2. For example, the valve 78 can be opened and particulate material admitted into the lock hopper 84. The valve 88 can then be opened and residual vapors from the pelleting liquid flushed into the columnar vessel 2 by steam. The valve 88 can then be closed and the valve 78 closed. The valve 80 can then be opened and closed to admit particulate material to the separation means 68 and to prepare for repeating the sequence beginning with opening the valve 78.

Preferably, vapors from the pelleting liquid are used to dry the pellets. The vapors come from an extraneous source as compared to being formed in situ such as by heating with steam. The vapors are preferably heated by indirect heat exchange outside of the columnar vessel. In this manner, expensive separation schemes can be avoided. In one embodiment, the means 22 for withdrawing a gas stream from the upper end 4 of the columnar vessel 2 is connected to the means 16 for introducing the hot gas into the lower end 6 of the columnar vessel. The means 22 can be formed by a blower 90 which is connected to the upper end 4 of the columnar vessel 2 by a conduit 92 to draw gases therefrom. The conduit means 94 is connected to a heater 96 where the vapors are to be recycled without further process steps such as purification or to a cooler 98 such as a condenser where it is desired to utilize the pelleting fluid for other purposes, such as in the pin pelleter 24. From the heater 96, a conduit 100 completes the flowpath from the upper end 4 of the columnar vessel 2 to the lower end 6. Similarly, the flash concentrator 48 can be equipped to concentrate the solids concentration in the slurry by recycling a portion of the fluid forming the slurry in hot vapor form. For example, a conduit 102 connects an upper end to the flash concentrator 48 to a blower 104 positioned to draw from the flash concentrator 48. A conduit means 106 connects the blower 104 to a heater 108 where it is desired to recycle the fluid to the flash concentrator or to a cooler 110 where other uses for the withdrawn fluid are intended. In the illustrated embodiment, flow between the heater 108 and cooler 110 can be controlled by manipulating a valve 112 positioned in the conduit means 106 downstream of the branch leading to the heater 108. Conduit 114 connects the heater 108 with the flash concentrator vessel 48 to provide a means for the introduction of heated fluid into a lower portion of the flash concentrator vessel. The condensor 110 is connected to the pin pelleter 24, for example, by the conduit 25.

According to other aspects of the present invention, there is provided a process for pelleting particulate material, especially carbon black. The carbon black is pelleted with a liquid pelleting fluid to form wet pelleted carbon black and pelleting fluid and then dried with the hot vapors of the pelleting fluid. By utilizing a pelleting fluid characterized by heat of vaporization of less than about 25,000 BTU/FT$^3$, substantial energy savings over pelleting with water and drying with steam can be achieved. Wet pelleting involves first filling the interstitial spaces between the particles with liquid. The volume of liquid required for filling the interstitial spaces is substantially independent of the density of the liquid. By using a liquid having a density less than that of water, fewer pounds of liquid are required to accomplish the pelleting. By using the liquid which has a heat of vaporization based on mass less than that of water, the heat requirements can be further greatly reduced. To allow for direct comparisons between the energy requirements of processes using various pelleting liquids and water, the heat of vaporization can be expressed in terms of BTU/FT$^3$ and compared with water, which has a heat of vaporization of 56,187 BTU/FT$^3$. For example, water pelleting requires about 10.9 times as much energy as hexane pelleting, hexane having a heat of vaporization of about 5150 BTU/FT$^3$. By selecting a liquid having a heat of vaporization of less than 25,000 BTU/FT$^3$ the energy requirements for the drying process can be more than halved over using water. By selecting a pelleting fluid characterized by heat of vaporization of less than 10,000 BTU/FT$^3$, the energy requirements to carry out the drying process can be reduced to less than about 1/5 of that required of the conventional process involving pelleting with water and drying with steam. Materials meeting these criteria can be easily selected from thermodynamic tables. It is further desirable that the material selected have a normal boiling point in the range of from about $-50°$ F. to about 300° F. so that heat losses driven by the temperature difference between the drying process and the environment can be maintained at low values. Preferably, the pelleting fluid is characterized by a normal boiling point in the range of from about $-50°$ F. to about 250° F. Suitable pelleting fluids include hydrocarbons and ethers which will generally contain from about 4 to bout 9 carbon atoms, and alcohols, aldehydes, ketones, carboxylic acids and esters which generally contain from about 1 to about 6 carbon atoms and hydrocarbyl chlorides and hydrocarbyl fluorides, by which is meant chloride and/or fluoride substituted hydrocarbons not necessarily containing any hydrogen atoms and generally having from about 1 to about 5 carbon atoms. Preferably, the pelleting fluid comprises a hydrocarbon containing from 5 to about 8 carbon atoms such as pentane or n-hexane or a petroleum derived naphtha having an end boiling point of less than 250° F.

According to certain other aspects of the invention, there is provided a process for drying agglomerated carbon black particles in an energy efficient manner. The process comprises introducing wet pellets of carbon black which are wetted with a liquid pelleting fluid into the upper end of the drying vessel and rolling them to the lower end of the drying vessel. Hot vapors of the pelleting fluid are introduced into the lower end of the drying vessel and flowed to the upper end of the drying vessel in intimate countercurrent contact with the wet pellets. The pelleting liquid becomes vaporized due to the heat exchange with the hot vapors and dry pellets are removed from the lower end of the drying vessel. By using a pelleting fluid characterized by heat of vaporization of less than 25,000 BTU/FT$^3$ and a normal boiling point in the range of $-50°$ F. to 300° F. the drying process can be conducted with a high degree of operating efficiency.

The pelleted carbon black can be provided by pelleting flocculant carbon black with the pelleting fluid. The pelleting can be carried out with fluid recovered from the hot vapors from the drying process. For example, hot vapors of the pelleting fluid can be withdrawn from the upper end of the drying vessel and a first portion of the withdrawn hot vapors can be condensed to form at least a portion of the pelleting fluid utilized in the pelleting of the flocculant carbon black. A second portion of the withdrawn hot vapors can be heated and utilized to form at least a portion of the hot vapor introduced into the drying process to drive off the liquid from the pellets.

According to certain other aspects of the present invention there is provided a process comprising spraying a slurry of carbon black and liquid pelleting fluid into the upper portion of the drying vessel. A stream of carbon black pellets is introduced into the upper portion of the drying vessel so that at least a portion of the slurry deposits on the pellets. The pellets provide a non-fouling surface upon which the spray can be deposited. The pellets can be flowed to a lower portion of the drying vessel and withdrawn. By introducing a heated stream of pelleting fluid vapor into the lower portion of the vessel for countercurrent flow with respect to the pellets, the pellets can be suitably dried. Pelleting fluid vapor can be withdrawn from an upper portion of the drying vessel and condensed or heated for recycle as desired. Generally speaking, the slurry to be sprayed into the drying vessel comprises in the range from about 5 to about 25 percent by weight of carbon black. Preferably, the carbon black is the furnace type which has a higher structure than thermal or channel black. It is desirable that the concentration of carbon black in the slurry be as high as possible limited by viscosity constraints which generally will apply to slurries having a concentration of carbon black much above 25 percent by weight. The advantage to using a slurry having a high concentration of carbon black is that it becomes easier to dry the exterior surface of the pellets so that they become non-sticky prior to the pellet contacting an interior surface of the drying vessel. Where the concentration of carbon black in the slurry is at a desirably high level, the pellets formed can be surface dried by free-fall and the drying process completed by allowing the pellets to fall to a mid-portion of the vessel and then roll along inclined perforated trays or screens to the lower portion.

One manner in which the slurry can be concentrated to a high level of solids content involves introducing the concentrated slurry into the drying vessel from a flash vessel. In the flash vessel, the slurry of carbon black and the liquid pelleting fluid is introduced and subjected to intimate countercurrent contact with hot vapors of the pelleting fluid to form a concentrated slurry. The concentrated slurry is withdrawn from the flash vessel and introduced into the upper end of the drying vessel. The slurry is then formed into droplets such as by being sprayed through a pressure nozzle or transformed into droplets by a mechanical particulator and hot vapors of the pelleting fluid are flowed in intimate countercurrent contact with the droplets of the slurry until they are transformed into pellets. At a concentration of about 25 weight percent in the slurry tread-grade black will exhibit semisolid behavior. Generally speaking, the term pellet is meant to include semisolid particles which have been surface dried sufficiently to exhibit non-stickness as well as finished pellets having a pelleting liquid content of less than 1 percent by weight, for example. One manner in which fine particles of carbon black pellets can be formed comprises depositing the concentrated slurry on the face of the spinning disk having vanes attached to the face to form the concentrated slurry into droplets. The size of the droplets can be selected as desired by controlling the flow rate of the slurry into the drying vessel as well as by controlling the speed of the spinning disk. The droplets of the slurry or pellets depending on the degree of surface dryness are deposited on the inclined perforated plates positioned in the drying vessel and rolled along the perforated plates or screens to the lower end of the drying vessel. The pellets are dried by being subjected to countercurrent flow of hot vapor of the pelleting fluid. If desired, the carbon black which is collected from the drying vessel can be subjected to a separation or screening procedure and the carbon black pellets which have a size above and or below a selected size range can be recycled and introduced back into the drying vessel. The hot vapors used to drive off the liquid pelleting fluid can be expeditiously provided by withdrawing hot vapor pelleting fluid from an upper portion of the drying vessel, heating at least a portion of the hot vapor fluid thus withdrawn and introducing at least a portion of the heated portion into a lower portion of the drying vessel.

Exemplary materials suitable for utilization as a pelleting fluid include ammonia, sulfur dioxide, methyl chloride, carbon tetrachloride, carbon disulfide, dichlorodifluoromethane, methanol, formic acid, methyl formate, acetaldehyde, acetone, diethyl ether and hydrocarbons, preferably alkanes or mixtures thereof such as propane, isobutane, normal butane, normal hexane, normal heptane and isooctane.

The invention is illustrated by the following example.

EXAMPLE

In a calculated example: a feed stream 5000 lb/hr of carbon black in 3318 lb/hr of n-hexane is fed to columnar vessel 2 as a slurry from line 44 through line 46 and through nozzles 42. The pelleting fluid n-hexane has a boiling point of 156° F. and a latent heat of 125 BTU/lb. The columnar vessel 2 has two baffles 8 set at 60° with six $\frac{1}{4}''$ diameter holes per square inch or 30% open area. The columnar vessel 2 would have an ID of 3'0" and a cylindrical length of 20'0". The operating pressure of the process vessel is 1.0" $H_2O$. Upward velocity of vapors in the vessel is 1.2 ft/sec. A blower 90 recycles 1707 lb/hr of vapors at 250° F. through heater 96 which provides 412,125 BTU/hr of heat into the system bringing line 100 to 600° F. Purge steam is fed at 35 lb/hr into lock hopper 84. Carbon black is discharged through line 82 at 5,000 lb/hr with 25 lb of n-hexane. Vapors are condensed at 3,297 lb/hr in cooler 98.

A comparison of energy requirements using n-hexane or as previously described or water as the pelleting fluid:

Heat Load With Normal Hexane = 412,125 BTU/hr
Heat Load if Water Used = 4,498,200 BTU/hr The improvement factor is calculated as follows:

| | | Improvement Factor |
|---|---|---|
| Due to Latent Heat: | | |
| $\frac{900 \text{ BTU/lb water}}{125 \text{ BTU/lb } C_6}$ | = | 7.2 |
| Due to density | | |
| $\frac{8.33 \text{ Density of water}}{5.33 \text{ Density of } C_6}$ | = | 1.5 |
| Improvement in efficiency (these factors reinforce each other) | = | 2.2 |
| TOTAL IMPROVEMENTS | = | 10.9 |

The improvement over a process using water is quite dramatic.

What is claimed is:

1. A process comprising
   (a) pelleting carbon black with a liquid pelleting fluid to form wet pellets of carbon black and pelleting fluid; and
   (b) drying the wet pellets with hot vapors of said pelleting fluid from an extraneous source;
   wherein said pelleting fluid is characterized by a heat of vaporization of less than 25,000 BTU/FT$^3$ and a normal boiling point in the range of $-50°$ F. to $300°$ F.

2. A process as in claim 1 wherein the pelleting fluid is characterized by a heat of vaporization of less than 10,000 BTU/FT$^3$.

3. A process as in claim 2 wherein the pelleting fluid is characterized by a normal boiling point in the range of $50°$ F. to $250°$ F.

4. A process as in claim 3 wherein the pelleting fluid is selected from the group consisting of hydrocarbons, ethers, alcohols, aldehydes, ketones, carboxylic acids, esters, hydrocarbyl chlorides and hydrocarbyl fluorides.

5. A process as in claim 4 wherein the pelleting fluid comprises a hydrocarbon containing from 5 to 8 carbon atoms.

6. A process comprising introducing wet pellets of carbon black wetted with a liquid pelleting fluid into the upper end of a drying vessel;
   rolling the pellets to the lower end of the drying vessel;
   introducing hot vapors of the pelleting fluid into the lower end of the drying vessel;
   flowing the hot vapors to the upper end of the drying vessel in intimate countercurrent contact with the wet pellets; and
   removing dry pellets from the lower end of the drying vessel;
   wherein the pelleting fluid is characterized by a heat of vaporization of less than 25,000 BTU/FT$^3$ and a normal boiling point in the range of $-50°$ F. to $300°$ F.

7. A process as in claim 6 further comprising
   pelleting flocculent carbon black with the pelleting fluid to provide the wet pellets;
   withdrawing hot vapors of pelleting fluid from the upper end of the drying vessel;
   condensing a first portion of the withdrawn hot vapors to form at least a portion of the pelleting fluid utilized in the pelleting of the flocculent carbon black; and
   heating a second portion of the withdrawn hot vapors to form at least a portion of the hot vapors introduced into the drying vessel.

8. A process as in claim 7 wherein the pelleting fluid is characterized by a heat of vaporization of less than 10,000 BTU/FT$^3$, a normal boiling point in the range of $50°$ F. to $250°$ F., and is selected from the group consisting of hydrocarbons, ethers, alcohols, aldehydes, ketones, carboxylic acids, esters, chloride substituted hydrocarbons and fluoride substituted hydrocarbons.

9. A process comprising
   (a) spraying a slurry of carbon black in liquid pelleting fluid into an upper portion of a drying vessel;
   (b) introducing a stream of carbon black pellets into the upper portion drying vessel so that the slurry deposits on the pellets;
   (c) flowing the pellets to a lower portion of the drying vessel;
   (d) withdrawing the pellets from the power portion of the vessel;
   (e) introducing a heated stream of pelleting fluid vapor into a lower portion of the vessel for countercurrent flow with respect to the pellets; and
   (f) withdrawing a stream of pelleting fluid vapor from an upper portion of the drying vessel.

10. A process as in claim 9 wherein the pellets fall freely to a mid portion of the vessel then along inclined perforated trays to the power portion of the vessel.

11. A process as in claim 10 wherein the slurry to be sprayed into the drying vessel comprises in the range of 5 to 25 percent by weight of carbon black.

12. A process as in claim 11 wherein the pelleting fluid is characterized by a heat of vaporization of less than 10,000 BTU/FT$^3$, a normal boiling point in the range of $50°$ F. to $250°$ F. and is selected from the group consisting of hydrocarbons, chloride and/or fluoride substituted hydrocarbons, ethers, alcohols, aldehydes, esters, ketones, and carboxylic acids.

13. A process comprising
   (a) introducing a slurry of carbon black and liquid pelleting fluid into a concentration vessel;
   (b) concentrating the slurry by subjecting same to intimate countercurrent contact with hot vapors of pelleting fluid to form a concentrated slurry;
   (c) withdrawing the concentrated slurry from the concentrating vessel;
   (d) introducing the concentrated slurry into an upper end of a drying vessel;
   (e) forming the slurry into droplets;
   (f) flowing hot vapors of the pelleting fluid in intimate countercurrent contact with the droplets of the slurry to transform the droplets into pellets; and
   (g) collecting the pellets of carbon black thus produced.

14. A process as in claim 13 further comprising controlling the flow rate of the slurry into the drying vessel;
   depositing the concentrated slurry on the face of a spinning disk having vanes attached to the face to form the concentrated slurry into droplets;
   depositing the droplets or pellets onto inclined perforated plates positioned in the drying vessel and rolling the droplets or pellets along the perforated plates to the lower end of the drying vessel while subjecting same to countercurrent flow of hot vaporous pelleting fluid.

15. A process as in claim 14 further comprising separating the pellets of carbon black which are of a size above or below a selected range and introducing the separated pellets into the drying vessel.

16. A process as in claim 15 further comprising withdrawing hot vaporous pelleting fluid from an upper portion of the drying vessel, heating at least a portion of said hot vaporous pelleting fluid and introducing at least a portion of the heated portion into a lower portion of the drying vessel.

17. A process as in claim 14 wherein the concentrated slurry has a concentration of carbon black in the range of from about 5 weight percent to about 40 weight percent and the pelleting fluid is characterized by a heat of vaporization of less than 25,000 BTU/FT$^3$ and has a normal boiling point in the range of $-50°$ F. to $300°$ F.

18. A process as in claim 17 wherein the pelleting fluid is characterized by a heat of vaporization of less than 10,000 BTU/FT$^3$ and has a normal boiling point in the range of $50°$ F. to $250°$ F.

* * * * *